(12) United States Patent
Ukegawa et al.

(10) Patent No.: US 12,379,984 B2
(45) Date of Patent: Aug. 5, 2025

(54) REMAINING USEFUL LIFE DETERMINATION FOR POWER ELECTRONIC DEVICES

(71) Applicant: Toyota Motor Engineering & Manufacturing North America, Inc., Plano, TX (US)

(72) Inventors: Hiroshi Ukegawa, South Lyon, MI (US); Raymond P. Viviano, Hazel Park, MI (US); Shailesh N. Joshi, Ann Arbor, MI (US); Qian Yang, Vernon, CT (US); Krishna Pattipati, Storrs, CT (US)

(73) Assignees: Toyota Motor Engineering & Manufacturing North America, Inc., Plano, TX (US); University of Connecticut, Storrs, CT (US)

( * ) Notice: Subject to any disclaimer, the term of this patent is extended or adjusted under 35 U.S.C. 154(b) by 104 days.

(21) Appl. No.: 18/129,594

(22) Filed: Mar. 31, 2023

(65) Prior Publication Data
US 2024/0193025 A1 Jun. 13, 2024

Related U.S. Application Data

(60) Provisional application No. 63/386,564, filed on Dec. 8, 2022.

(51) Int. Cl.
*G06F 11/00* (2006.01)
*G06F 11/07* (2006.01)
*G06N 20/00* (2019.01)

(52) U.S. Cl.
CPC ........ *G06F 11/0751* (2013.01); *G06F 11/008* (2013.01); *G06F 11/0721* (2013.01); *G06N 20/00* (2019.01)

(58) Field of Classification Search
CPC ............ G06F 11/0721; G06F 11/0751; G06F 11/008; G06N 20/00
See application file for complete search history.

(56) References Cited

U.S. PATENT DOCUMENTS

| 7,271,608 B1 | 9/2007 | Vermeire et al. |
| 8,103,463 B2 | 1/2012 | Kalgren et al. |

(Continued)

FOREIGN PATENT DOCUMENTS

WO 2012/151150 A1 11/2012

OTHER PUBLICATIONS

Singleton II, Rodney K. et al., Extended Kalman Filtering for Remaining-Useful-Life Estimation of Bearings, 2014, IEEE (Year: 2014).*

(Continued)

*Primary Examiner* — Marc Duncan
(74) *Attorney, Agent, or Firm* — Christopher G. Darrow; Darrow Mustafa PC (57) ABSTRACT

Systems, methods, and other embodiments described herein relate to predicting anomalous operation of a device and an associated remaining useful life (RUL) estimation. In one embodiment, a method includes acquiring usage information about the operation of an electronic device. The method includes determining whether the usage information indicates the presence of an anomaly in the operation of the electronic device according to an anomaly model. The method includes, responsive to detecting the anomaly, determining a remaining useful life (RUL) for the electronic device according to a RUL model. The method includes providing the RUL estimate.

20 Claims, 7 Drawing Sheets

(56) References Cited

U.S. PATENT DOCUMENTS

| | | | |
|---|---|---|---|
| 8,600,685 | B2 | 12/2013 | Kalgren et al. |
| 9,494,657 | B2 | 11/2016 | Khan et al. |
| 9,933,338 | B2 | 4/2018 | Noda et al. |
| 10,090,798 | B2 | 10/2018 | Watanabe et al. |
| 10,354,462 | B1 | 7/2019 | Zhang et al. |
| 10,410,116 | B2 | 9/2019 | Husain et al. |
| 10,560,047 | B2 | 2/2020 | Joshi et al. |
| 10,605,854 | B2 | 3/2020 | Sathik et al. |
| 10,650,616 | B2 | 5/2020 | Zhang et al. |
| 10,672,199 | B2 | 6/2020 | Landolsi et al. |
| 10,692,302 | B2 | 6/2020 | Dede et al. |
| 11,099,551 | B2 | 8/2021 | Ristovski et al. |
| 11,474,146 | B2 | 10/2022 | Degrenne et al. |
| 2008/0141072 | A1* | 6/2008 | Kalgren ............... G01D 3/08 714/33 |
| 2018/0276546 | A1 | 9/2018 | Joshi et al. |
| 2019/0250205 | A1 | 8/2019 | Sarwar et al. |
| 2019/0278684 | A1 | 9/2019 | Dede et al. |
| 2021/0215760 | A1 | 7/2021 | McMenemy et al. |
| 2021/0341911 | A1 | 11/2021 | Joshi et al. |
| 2022/0004182 | A1 | 1/2022 | Natsumeda et al. |
| 2022/0100187 | A1 | 3/2022 | Isik et al. |
| 2022/0107630 | A1* | 4/2022 | Zope ................ G05B 19/4184 |
| 2022/0270189 | A1 | 8/2022 | Wetherbee et al. |
| 2024/0210936 | A1* | 6/2024 | Ukegawa ............ G05B 23/024 |

OTHER PUBLICATIONS

Zhou, Funa et al., Average Accumulative Based Time Variant Model for Early Diagnosis and Prognosis of Slowly Varying Faults, 2018, Sensors (Year: 2018).*

Yang, Qian et al., Incipient Residual-Based Anomaly Detection in Power Electronic Devices, 2022, IEEE (Year: 2022).*

Liao, Linxia et al., Review of Hybrid Prognostics Approaches for Remaining Useful Life Prediction of Engineered Systems, and an Application to Battery Life Prediction, 2014, IEEE (Year: 2014).*

Lei, Yaguo et al., A Model-Based Method for Remaining Useful Life Prediction of Machinery, 2016, IEEE (Year: 2016).*

Kabir et al., "A review of data-driven prognostics in power electronics", 2012 IEEE 35th International Spring Seminar on Electronics Technology, 2012, pp. 189-192.

Celaya et al., "Prognostics approach for power MOSFET under thermal-stress aging", 2012 IEEE Proceedings Annual Reliability and Maintainability Symposium, 2012, pp. 1-6.

Ni et al., "Overview of real-time lifetime prediction and extension for SiC power converters", IEEE Transactions on Power Electronics, 2019, pp. 7765-7794, vol. 35, No. 8.

Lall et al., "Prognostics health management of electronic systems under mechanical shock and vibration using kalman filter models and metrics", IEEE Transactions on Industrial Electronics, 2012, pp. 4301-4314, vol. 59, No. 11.

Sutharssan et al., "Data analysis techniques for real-time prognostics and health management of semiconductor devices", 18th IEEE European Microelectronics & Packaging Conference, 2011, pp. 1-7.

Haque et al., "Prognosis of power mosfet in continuous time framework", 2017 IEEE Applied Power Electronics Conference and Exposition (APEC), 2017, pp. 2269-2275.

Zheng et al., "A relevance vector machine-based approach for remaining useful life prediction of power mosfets", 2014 IEEE Prognostics and System Health Management Conference (PHM-2014 Hunan), 2014, pp. 642-646.

Ni et al., "Review of sic mosfet based three-phase inverter lifetime prediction", 2017 IEEE Applied Power Electronics Conference and Exposition (APEC), 2017, pp. 1007-1014.

Lelis et al., "Basic mechanisms of thresholdvoltage instability and implications for reliability testing of sic mosfets", IEEE Transactions on Electron Devices, 2014, pp. 316-323, vol. 62, No. 2.

Celaya et al., "Towards prognostics of power mosfets: Accelerated aging and precursors of failure", National Aeronautics and Space Administration Moffett Field CA Ames Research, Tech. Rep., 2010.

Pugalenthi et al., "Prognosis of power mosfet resistance degradation trend using artificial neural network approach", Microelectronics Reliability, 2019, p. 113467, vol. 100.

Shenoy et al., "Differential power processing for increased energy production and reliability of photovoltaic systems", IEEE Transactions on Power Electronics, 2012, pp. 2968-2979, vol. 28, No. 6.

Dusmez et al., "Remaining useful lifetime estimation for power mosfets under thermal stress with ransac outlier removal", IEEE Transactions on Industrial Informatics, 2017, pp. 1271-1279, vol. 13, No. 3.

Bayerer et al., "Model for power cycling lifetime of igbt modules-various factors influencing lifetime," 5th international conference on integrated power electronics systems, VDE, 2008, pp. 1-6.

Li et al., "A framework for model-based diagnostics and prognostics of switched-mode power supplies", Annual Conference of the PHM Society, 2014, vol. 6, No. 1.

Saha et al., "Towards prognostics for electronics components," 2009 IEEE Aerospace conference, 2009, pp. 1-7.

Saha et al., "Accelerated aging with electrical overstress and prognostics for power mosfets", 2011 IEEE Energy Tech., 2011, pp. 1-6.

Dusmez et al., "Remaining useful lifetime estimation for degraded power mosfets under cyclic thermal stress", 2015 IEEE Energy Conversion Congress and Exposition (ECCE), 2015, pp. 3846-3851.

Jensen et al., "A method for online stator insulation prognosis for inverter-driven machines", IEEE Transactions on Industry Applications, 2018, pp. 5897-5906, vol. 54, No. 6.

Al-Mohamad et al., "A hybrid system-level prognostics approach with online rul forecasting for electronics-rich systems with unknown degradation behaviors", Microelectronics Reliability, 2020, p. 113676, vol. 111.

Li et al., "A prognostic methodology for power mosfets under thermal stress using echo state network and particle filter," Microelectronics Reliability, 2018, pp. 350-354, vol. 88.

Witczak et al., "Remaining useful life prediction of mosfets via the takagi-sugeno framework", Energies, 2021, p. 2135, vol. 14, No. 8.

Gultekin et al., "High- and low-frequency accelerated stress tests for aging assessment of mosfet parameters," 2021 IEEE International Electric Machines & Drives Conference (IEMDC), 2021, pp. 1-4.

Kohonen et al., "The self-organizing map," Proceedings of the IEEE, 1990, pp. 1464-1480, vol. 78, No. 9.

Pan et al., "A hybrid dbn-som-pf-based prognostic approach of remaining useful life for wind turbine gearbox," Renewable Energy, 2020, pp. 138-154, vol. 152.

Krishna et al., "Genetic k-means algorithm," IEEE Transactions on Systems, Man, and Cybernetics, Part B (Cybernetics), 1999, pp. 433-439, vol. 29, No. 3.

Likas et al., "The global k-means clustering algorithm", Pattern Recognition, 2003, pp. 451-461, vol. 36, No. 2.

Arthur et al., "k-means++: the advantages of careful seeding", Proceedings of the Eighteenth Annual ACM-SIAM Symposium on Discrete Algorithms, Society for Industrial and Applied Mathematics,2007, pp. 1027-1035.

Luo et al., "Model-based prognostic techniques applied to a suspension system," IEEE Transactions on Systems, Man, and Cybernetics—Part A: Systems and Humans, 2008, pp. 1156-1168, vol. 38, No. 5.

Saxena et al., "On applying the prognostic performance metrics," Annual Conference of the PHM Society, 2009, vol. 1, No. 1.

Lai et al., "Multi-Dimensional Self Attention based Approach for Remaining Useful Life Estimation", Preprint submitted to Elsevier, Dec. 13, 2022.

McMenemy et al., "A Machine Learning Approach for Adaptive Classification of Power MOSFET Failures," 2019 IEEE Transportation Electrification Conference and Expo (ITEC), 2019, pp. 1-8.

Rigamonti et al., "A Self-Organizing Map-Based Monitoring System for Insulated Gate Bipolar Transistors Operating in Fully Electric Vehicle", Annual Conference of the Prognostics and Health Management Society 2015, 2015, pp. 1-9.

* cited by examiner

REMAINING USEFUL LIFE DETERMINATION FOR POWER ELECTRONIC DEVICES

CROSS-REFERENCE TO RELATED APPLICATIONS

This application claims benefit of U.S. Provisional Application No. 63/386,564, filed on, Dec. 8, 2022, which is herein incorporated by reference in its entirety.

TECHNICAL FIELD

The subject matter described herein relates, in general, to systems and methods for determining the remaining useful life (RUL) of a power electronic device, and, more particularly, to determining the RUL using models that learn characteristics of a specific device.

BACKGROUND

Predicting when a device will fail is a complex and elusive task. In particular, when a device, such as an electronic component within a vehicle, fails, the failure may have a broader effect on the functioning of the vehicle, thereby causing other systems in the vehicle to also fail and the vehicle to not function. Solutions for predicting the remaining useful life are often generalized to a class of devices without specificity to implementations for a particular instance. Moreover, various approaches broadly estimate remaining useful life without consideration to a trend in the functioning of a device that may rely on predefined degradation rates or static mathematical models. While these approaches can provide a general idea of when an electronic component may break, the accuracy fails to provide a precise estimate. As a result, erroneous indications may be provided to users causing unnecessary service and distrust in such systems when problems are actually imminent.

SUMMARY

In one embodiment, example systems and methods relate to predicting anomalous operation of a device and an associated remaining useful life (RUL) estimate. As noted previously, existing approaches generally do not provide precise determination of when a device may fail. That is, various approaches implement inflexible mechanisms, such as predefined degradation rates or static mathematical models, to provide estimates. However, these approaches cannot consider particularities of an individual device, such as nuances in the operation of that device or its usage. As a result, the accuracy of the predictions may suffer leading to inaccurate determinations with limited usefulness.

Therefore, in at least one approach, an inventive system tracks the operation of a power electronic device to model activity of the device and learn its operating characteristics from which determinations about the occurrence of anomalous conditions can be identified along with a remaining useful life (RUL) estimate of the device. For example, during the early life of the device, the system acquires usage and operational information and trains various models about the healthy operation of the device. The usage information can include various operating parameters, such as voltages, temperatures, etc. The models can include an anomaly detection model and a RUL model. The anomaly model, in one arrangement, functions to determine when usage information about the operation of the device varies outside of an operating range for the device, thereby indicating the onset of an anomaly. The anomaly may be indicative of degradation in the health of the device. The anomaly model itself may be a partial-least squares with cumulative sum (PLS-CUSUM) algorithm that operates to identify whether the observed usage and operational information conforms with the known patterns for the device.

Accordingly, when the usage information varies from the known patterns, the anomaly model indicates the occurrence of an anomaly, which may trigger further analysis of the device. Thus, in one arrangement, the system then proceeds to predict the RUL for the device. The system implements a RUL model that, for example, includes multiple components. For example, the RUL model is comprised of a self-organizing map (SOM) and interacting multiple models (IMMs). The SOM determines the state of health (SoH) of the device for timepoints in a timeseries. In general, the SOM is a neural network that implements a clustering approach. That is, the SOM processes the usage information into a feature vector and then determines a proximity of a closest neuron to the feature vector. This provides a distance as the SoH for the time series data. The system can then use the SoH values with the IMMs to predict a RUL of the device. The IMMs include a set of Kalman filters that are adapted to different regimes, such as constant, linear degradation (possibly with different levels), exponential degradation, etc. The outputs of the IMMs are weighted and the RUL is provided from this.

Thereafter, the system determines a proximity of the device to an end-of-life state and can provide information to, for example, a driver, other systems associated with the device (e.g., vehicle diagnostic systems), and so on in order to account for the RUL of the device and avoid unexpected vehicle breakdown. In this way, the disclosed system functions to improve determinations about the SoH and RUL of the device and facilitates mitigation efforts.

In one embodiment, a correlation system for monitoring health of an electronic device is disclosed. The correlation system includes one or more processors and a memory communicably coupled to the one or more processors. The memory stores instructions that when executed by the one or more processors cause the one or more processors to acquire usage information about operation of the electronic device. The instructions including instructions to determine whether the usage information indicates the presence of an anomaly in the operation of the electronic device according to an anomaly model. The instructions including instructions to, responsive to detecting the anomaly, determine a remaining useful life (RUL) for the electronic device according to a RUL model. The instructions including instructions to provide the RUL.

In one embodiment, a non-transitory computer-readable medium for monitoring health of an electronic device and including instructions that, when executed by one or more processors, cause the one or more processors to perform various functions is disclosed. The instructions include instructions acquire usage information about operation of the electronic device. The instructions including instructions to determine whether the usage information indicates the presence of an anomaly in the operation of the electronic device according to an anomaly model. The instructions including instructions to, responsive to detecting the anomaly, determine a remaining useful life (RUL) for the electronic device according to a RUL model. The instructions including instructions to provide the RUL.

In one embodiment, a method is disclosed. The method includes acquiring usage information about operation of an electronic device. The method includes determining whether the usage information indicates the presence of an anomaly in the operation of the electronic device according to an anomaly model. The method includes, responsive to detecting the anomaly, determining a remaining useful life (RUL) for the electronic device according to a RUL model. The method includes providing the RUL.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with predicting anomalous operation of a device and an associated remaining useful life (RUL) estimate are disclosed. As noted previously, existing approaches generally do not provide precise determinations of when a device may fail. That is, various approaches implement inflexible mechanisms, such as predefined degradation rates or static mathematical models, to provide estimates. However, these approaches cannot consider particularities of an individual device, such as nuances in the operation of that device. As a result, the accuracy of the predictions may suffer leading to inaccurate determinations with limited usefulness.

Therefore, in at least one approach, an inventive system tracks the operation of a power electronic device to model the activity of the device and learn operating characteristics from which determinations about the occurrence of anomalous conditions can be identified. Once the system detects an anomaly, further predictions relating to the remaining useful life (RUL) of the device may be undertaken in order to forecast potential failures and thereby provide mechanisms for mitigating such issues. For example, during the early life of the device, the system acquires usage information about how the device is operating and trains the various models about the healthy operation of the device. The usage information can include various operating parameters, such as voltages, temperatures, etc. The models can include an anomaly model and a RUL model. The anomaly model, in one arrangement, functions to determine when usage information about the device varies outside of an operating range, thereby indicating the onset of an anomaly. The anomaly may be indicative of degradation in the health of the device. The anomaly model itself may be a partial-least squares with cumulative sum (PLS-CUSUM) algorithm that operates to identify whether the observed usage information correlates with known patterns for the device.

Accordingly, when the usage information varies from the known patterns, the anomaly model indicates the occurrence of an anomaly, which may trigger further analysis of the device. Thus, in one arrangement, the system then proceeds to predict the RUL for the device that facilities determining when the device may fail. The system implements a RUL model that, for example, includes multiple components. For example, the RUL model is comprised of a self-organizing map (SOM) and interacting multiple models (IMMs). The SOM determines the state of health (SoH) of the device for timepoints in a timeseries. In general, the SOM is a neural network that implements a clustering approach. That is, the SOM processes the usage information into a feature vector and then determines a proximity of a closest neuron to the feature vector. This provides a distance as the SoH for the time-series data. The system can then use the SoH values with the IMMs to predict a RUL of the device. The IMMs include, for example, a set of Kalman filters that are adapted to different regimes, such as constant, linear degradation, exponential degradation, etc. The outputs of the IMMs are weighted and the RUL is provided from this.

Thereafter, the system determines a proximity of the device to an end-of-life state and can provide information to, for example, a driver, other systems associated with the device (e.g., vehicle diagnostic systems), and so on in order to account for the RUL of the device and avoid unexpected failure. In this way, the disclosed system functions to improve determinations about the SoH and the RUL of the device and facilitate mitigation efforts.

Figure 1:
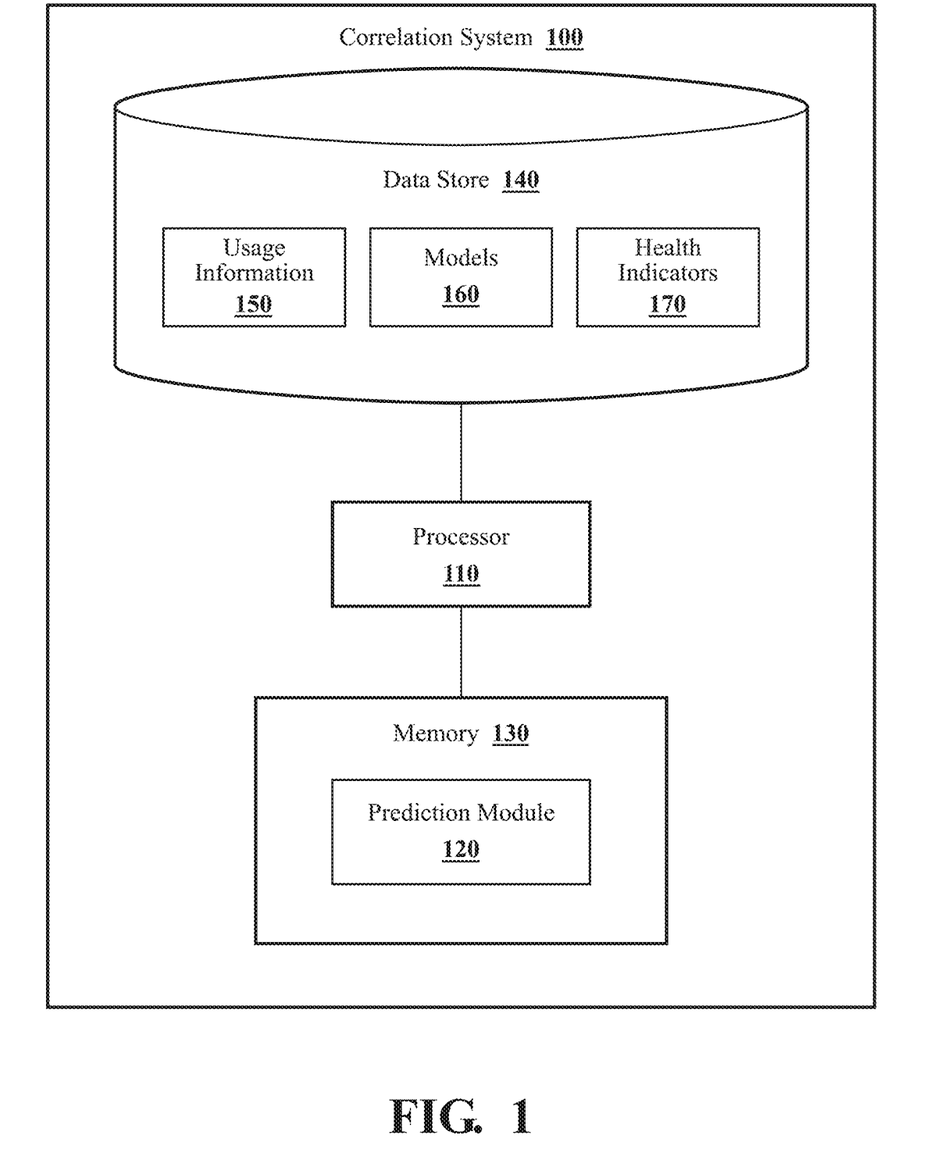
FIG. 1 illustrates one embodiment of a correlation system associated with analyzing usage information to identify anomalies and estimate the remaining useful life (RUL).

Referring to FIG. 1, one example of a correlation system 100 that functions to monitor a device for anomalies and determines a remaining useful life estimate of the device is shown. While depicted as a standalone component, in one or more embodiments, the correlation system 100 is cloud-based and thus can include elements that are distributed among different locations. In general, the correlation system 100 is implemented to acquire usage information 150 and analyze the usage information 150 using models 160 to generate health indicators 170. The noted functions and methods will become more apparent with a further discussion of the figures.

With further reference to FIG. 1, one embodiment of the correlation system 100 is further illustrated. The correlation system 100 is shown as including a processor 110. Accordingly, the processor 110 may be a part of the correlation system 100, or the correlation system 100 may access the processor 110 through a data bus or another communication path. In one or more embodiments, the processor 110 is an application-specific integrated circuit (ASIC) that is configured to implement functions associated with a prediction module 120. In general, the processor 110 is an electronic processor, such as a microprocessor that is capable of performing various functions as described herein. In one embodiment, the correlation system 100 includes a memory 130 that stores the prediction module 120 and/or other modules that may function in support of generating depth information. The memory 130 is a random-access memory (RAM), read-only memory (ROM), a hard disk drive, a flash memory, or other suitable memory for storing the prediction module 120. The prediction module 120 is, for example, computer-readable instructions that, when executed by the processor 110, cause the processor 110 to perform the various functions disclosed herein. In further arrangements, the prediction module 120 is a logic, integrated circuit, or another device for performing the noted functions that includes the instructions integrated therein.

Furthermore, in one embodiment, the correlation system 100 includes a data store 140. The data store 140 is, in one arrangement, an electronic data structure stored in the memory 130 or another electronic medium, and that is configured with routines that can be executed by the processor 110 for analyzing stored data, providing stored data, organizing stored data, and so on. Thus, in one embodiment, the data store 140 stores data used by the prediction module 120 in executing various functions. For example, as depicted in FIG. 1, the data store 140 includes the usage information 150, models 160 that are, in at least one approach, machine-learning models, and health indicators 170, along with, for example, other information that is used and/or produced by the prediction module 120. While the correlation system 100 is illustrated as including the various elements, it should be appreciated that one or more of the illustrated elements may not be included within the data store 140 in various implementations. In any case, the correlation system 100 stores various data elements in the data store 140 to support functions of the prediction module 120.

Continuing with the highlighted data elements, the usage information 150 includes, for example, battery management system (BMS) information, device monitoring data, and/or other information acquired about the use of a power electronics device that is being monitored. In general, the usage information 150 includes information that characterizes the use and operation of the device, which may include information about how associated components/systems (e.g., a vehicle) were used, raw data signals, derivative data signals, and so on. Accordingly, as one example, the usage information 150 includes a voltage (e.g., drain-to-source voltage), a current (e.g., drain-to-source current), temperature (e.g., operating temperatures, temperature limits), drain-to-source resistance, thermal resistance, gate leakage current, and so on. The foregoing is intended to be representative of one example and should not be construed as a limiting example. It should be further appreciated that the indicated information may include historical data about the noted values over a history of the device as opposed to discrete values from a present instant alone. For example, the system may accumulate state of health (SoH) values from prior cycles.

Continuing with elements shown in the data store 140, the models 160 are, in one arrangement, machine-learning models and/or other algorithms. In one arrangement, the models include an anomaly model and a RUL model. The anomaly model is, in at least one configuration, comprised of multiple different aspects. For example, the anomaly model can include a partial-lease squares regression (PLS). The PLS component considers predictor and criterion covariance together producing latent components of predictor variables that reliably predict a criterion variable. In particular, the PLS component learns from training data about a specific device in order to model how the healthy device operates. The anomaly model further includes a cumulative sum (CUSUM) algorithm that uses a residual signal from the PLS component and tracks if the residual signal is outside of a defined range based on the variability from known healthy operation (e.g., via a threshold). The CUSUM algorithm accumulates a metric of the residual sequentially and when the metric/residual is outside of the healthy operation threshold and determines when the accumulated metric satisfies (e.g., meets or exceeds) a predetermined threshold to detect an anomaly.

The RUL model, in one configuration also includes multiple aspects. For example, the RUL model functions to predict the remaining useful life (RUL) of the device. The remaining useful life is an estimate of how long the device will continue to function as measured according to, for example, a state of health. The state of health (SoH) is a metric that characterizes the current health of the device in relation to known healthy operation and may take the form of a distance metric of observed or predicted parameters in relation to known healthy parameters (e.g., voltages, etc.). The RUL model comprises a self-organizing map (SOM) and interacting multiple models (IMMs). The SOM is comprised of a two-layer neural network structure. The two-layer neural network structure includes an input layer and an organized map layer. Neurons in the organized map layer connect with surrounding neighbor neurons producing a lattice structure. In general, the SOM implements a clustering approach where the usage information is input to the input layer and the map layer determines the SOH according to a best-matching unit (BMU) of the map layer relative to the input. This can be quantized as a Euclidean distance that is output as the SOH.

The RUL model further implements the IMMs to predict future SOHs according to current and preceding SOH values out to a defined prediction of "n" timepoints into the future. The IMMs simultaneously compute multiple extended Kalman filter degradation models (e.g., constant, linear, exponential, autoregressive). The IMMs further function to weight the separate models for a given future timepoint according to, for example, estimated likelihood of being correct for that timepoint. Accordingly, the correlation system 100 assigns different weights to the outputs of the IMMs in order to determine which one to select or when to combine all of the results in order to provide an appropriate emphasis on a given model. In any case, when the estimated SOH of a future timepoint crosses a predetermined threshold, the time difference between the future timepoint and the current operating timepoint is calculated as the estimated RUL until the device failure.

In any case, FIG. 1 further illustrates the data store 140 as, including the health indicators 170. The health indicators 170, in at least one configuration, include aspects generated by the models 160. For example, the indicators can include determinations about anomalies, previous recorded values of the usage information 150, previous predictions of the SoH, a remaining useful life (RUL) and/or prior predictions of the RUL, and so on. In at least one approach, the RUL is a remaining useful life of the device according to a defined number of operating units, which may be indicated in time (e.g., seconds, minutes) or according to a cycle of the device (e.g., charge/discharge cycles). Of course, the RUL may be defined according to various conditions of the device that influence whether the device remains operable or not.

Figure 2:
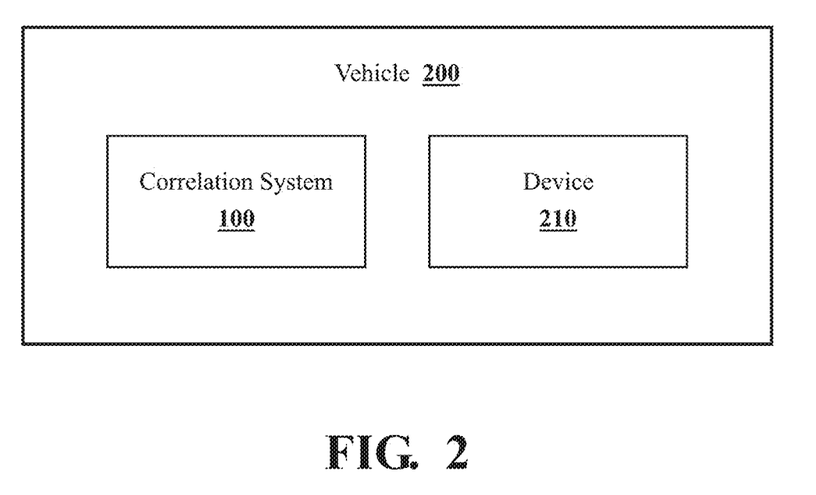
FIG. 2 illustrates one embodiment of the system of FIG. 1 integrated with a vehicle to monitor a device.

With reference to FIG. 2, one implementation of the correlation system 100 is illustrated. As shown in FIG. 2, a vehicle 200 includes the correlation system 100 that is implemented to monitor a device 210. The device 210 may be a power control unit (PCU), an electronic control unit (ECU), an insulated-gate bipolar transistor (IGBT), a metal-oxide-semiconductor field-effect transistor (MOSFET), an inverter, a converter, or another power electronic device for which the usage information 150 is available and thus the correlation system 100 can generate anomaly and RUL determinations.

Figure 3:
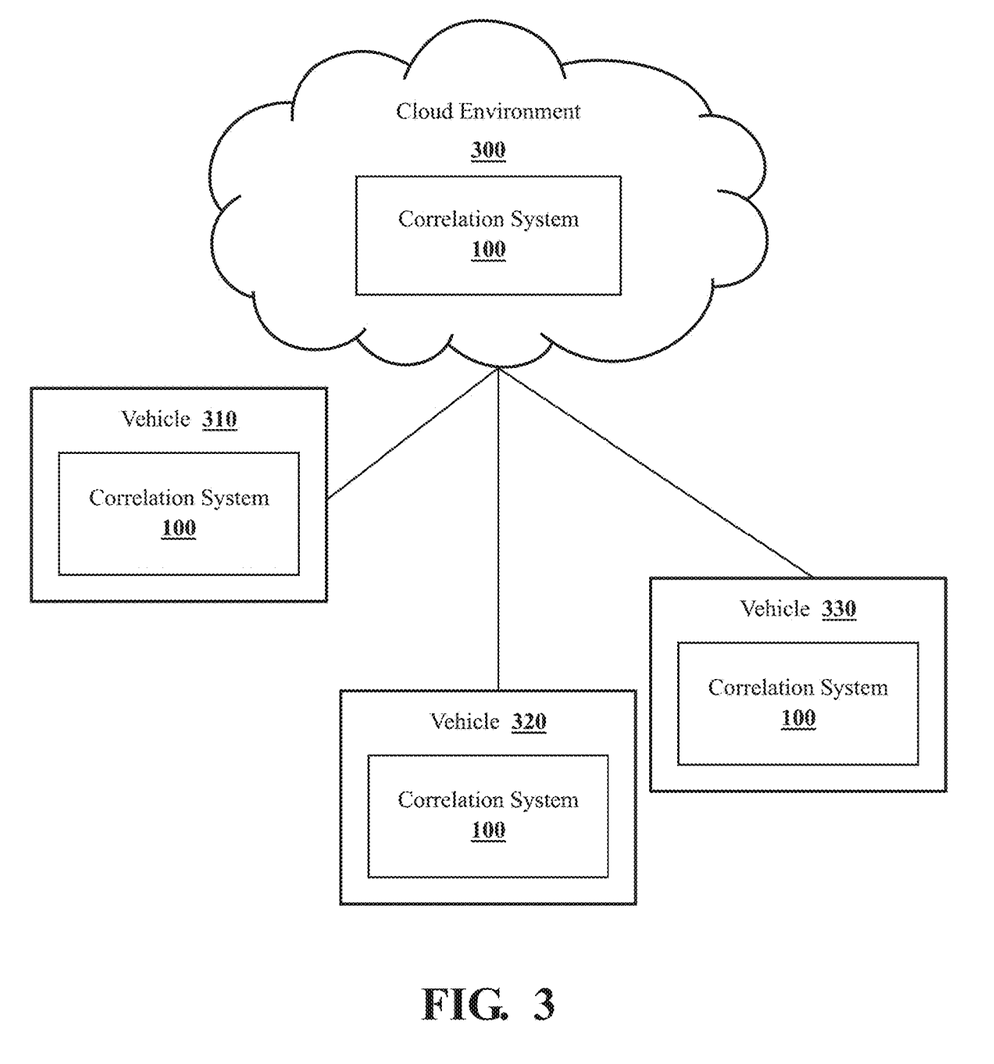
FIG. 3 illustrates one embodiment of a cloud-based computing environment.

A further embodiment of the correlation system 100 is illustrated in FIG. 3. As previously noted, the correlation system 100 may be further implemented within, for example, a cloud-based system that functions within a cloud environment 300, as illustrated in relation to FIG. 3. That is, for example, the correlation system 100 may acquire data (e.g., usage information 150) from client instances within the vehicles 310, 320, and 330 and perform analysis at a remote server that is integrated as part of the cloud environment 300. Accordingly, the instances of the correlation system 100 within the vehicles 310, 320, and 330 communicate wirelessly with the cloud-environment 300 via a cellular network (e.g., Frequency-Division Multiple Access (FDMA), Code-Division Multiple Access (CDMA), etc.), a peer-to-peer (P2P) based network, WiFi, DSRC, V2I, V2V or another communication protocol that is capable of conveying the usage information 150 and determinations according thereto between the entities.

Figure 4:
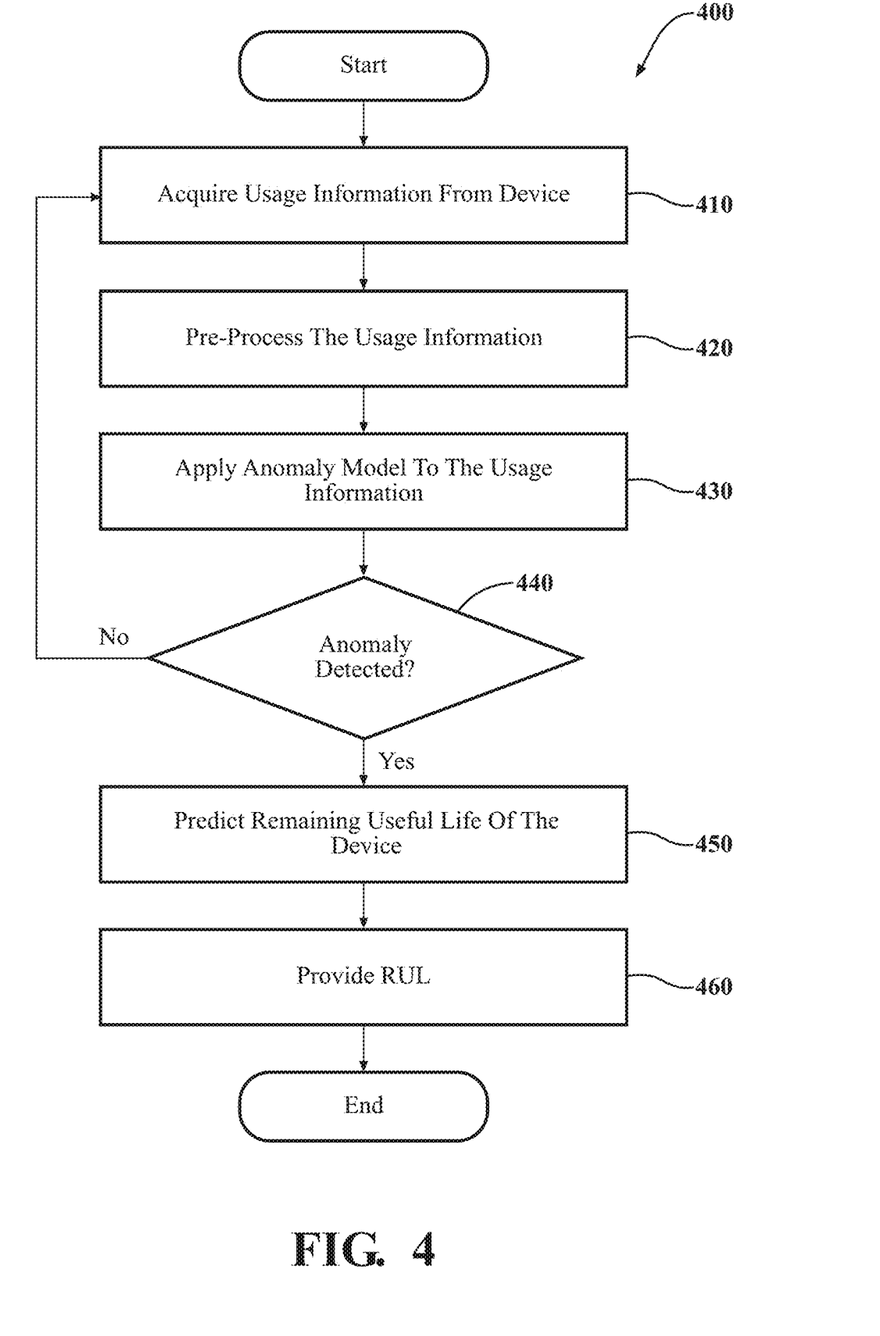
FIG. 4 is a flowchart illustrating one embodiment of a method for detecting anomalies and predicting a RUL for a device.

Additional aspects of monitoring power electronic devices will be discussed in relation to FIG. 4. FIG. 4 illustrates a flowchart of a method 400 that is associated with predicting anomalous operation of a device and an associated remaining useful life (RUL). Method 400 will be discussed from the perspective of the correlation system 100 of FIG. 1. While method 400 is discussed in combination with the correlation system 100, it should be appreciated that the method 400 is not limited to being implemented within the correlation system 100 but is instead one example of a system that may implement the method 400.

At 410, the prediction module 120 acquires the usage information 150. As indicated previously, the usage information 150 indicates aspects about operation of a device that is being monitored. Thus, in one arrangement, the prediction module 120 acquires the usage information 150 by electronically retrieving signals embodying the usage information 150 from one or more sensors associated with the device. In general, the signals include time-series data and indicate aspects, such as drain-to-source voltage, drain-to-source resistance, temperature, thermal resistance, gate-leakage current, and so on. Thus, the correlation system 100 generally includes an operable communication link with the device or other systems associated with the device in order to acquire the usage information 150. Thus, the correlation system 100 may actively acquire the usage information 150 via direction communication with the sensors embodied within or proximate to the device or may acquire the usage information 150 by sniffing the signals from communications on a communication bus or other network associated with the device. In any case, the prediction module 120 acquires the usage information 150 in an iterative manner in order to monitor a health of the device.

At 420, the prediction module 120 pre-processes the usage information 150. In one approach, the prediction module 120 pre-processes the usage information 150 to remove aberrations and format the usage information 150 for intake by the models 160. For example, the prediction module 120 filters and normalizes the usage information 150 to remove noise.

At 430, the prediction module 120 applies the anomaly model to the usage information 150. As noted previously, the anomaly model functions to determine when operation of the device deviates from known operation for the device when healthy. Accordingly, the prediction module 120 applies the anomaly model by initially transforming the usage information 150 from an input space into a partial-least squares (PLS) component space. This process transforms the usage information 150 into a latent space that is defined by linear combinations of the input variables according to correlation patterns learned through training, where the training is according to early-life operating characteristics of the device (i.e., operation when the device is known to be healthy). Effectively, this translates the usage information 150 into a space of the PLS algorithm.

As one example, application of the PLS algorithm to the transformed usage information involves predicting a set of information about the device from the particular input, which may include a single criterion variable (e.g., drain-to-source current). Thus, the PLS algorithm regresses a test set of criterion from which a residual value is calculated as a difference of the actual signal and the predicted signal. The cumulative sum (CUSUM) algorithm accumulates the residual when the residual is outside of a range based on the variability of the variable as known from training. Thus, the prediction module 120 is predicting operating values of the device and accumulating a residual according to a covariance between the operating values and observed values.

At 440, the prediction module 120 determines whether the anomaly model indicates the presence of an anomaly. In one arrangement, the prediction module 120 determines whether the residual that is accumulated satisfies an anomaly threshold. The correlation system 100 defines the anomaly threshold according to a variance observed over multiple cycles of analysis that is indicative of a continued deviations of the device from healthy operation. Thus, when the residual continues to vary and accumulate, then the prediction module 120 determines that the device is degrading and exhibiting anomalous behavior in relation to the healthy operation that was previously known. As shown in method 400, the operation of the correlation system 100 is iterative to repeat analysis of the device over and over in order to detect when the device begins to degrade. Thus, as the device begins to degrade and the operation varies further outside of normal operation, the variances accumulate as the residual and eventually satisfy the anomaly threshold (e.g., meet or exceed). When this occurs, the correlation system 100 transitions to determining the remaining useful life (RUL) at 450. Otherwise, the correlation system 100 continues to monitor for an anomaly by returning to acquiring the usage information at 410 and iterating the previously described actions.

At 450, the prediction module 120 determines a remaining useful life (RUL) for the device according to a RUL model. In one approach, the prediction module 120 uses the RUL model to determine the SoH for the device according to a self-organizing map (SOM). The prediction module 120 then uses the determined SoH values for the current and prior timepoints as inputs to interacting multiple models (IMMs) that are extended Kalman filters. The Kalman filters of the IMMs are separately configured to model degradation differently for different parts of the life of the device. For example, the IMMs include extended Kalman filters for constant degradation, linear degradation, nonlinear degradation, and so on. In general, the IMMs are predicting future SoH values out to a prediction horizon, which may be dynamically adapted according to values of the SoH or may be predefined.

Ultimately, in one arrangement, the prediction module 120 selects one of the extended Kalman filters for producing the future SOH values according to a posterior probability for each of the extended Kalman filters. Alternatively, the prediction module 120 separately weights the models and generates the SoH at each future timepoint according to the weighting of the combined models. For example, the prediction module 120 sums the estimates as weighted according to known likelihoods of accurately predicting the SoH for a given timepoint.

To restate the application of the RUL model by the prediction module 120, the SOM estimates the SoH for each timepoint in a life cycle of the device. That is, for every prior timepoint for which the prediction module 120 has information (i.e., prior values of the usage information 150), the prediction module 120 applies the SOM of the RUL model to generate an SoH value. Thus, the prediction module 120 calculates the historic and current SoHs for the life of the device up to a current timepoint. According to one embodiment, the SOM calculates the SoH as a Euclidean distance between the input layer and an identified best-matching unit (BMU) of the mapping layer. When the device is healthy, the calculated value remains relatively small. However, as the device degrades, the value grows larger.

To then estimate the RUL, the prediction module 120 estimates the future SoH values according to the current value and the preceding values. The prediction module 120 predicts the SoH out to a defined number "n" of timepoints into the future using the IMMs that simultaneously compute multiple extended Kalman filter degradation models. The prediction module 120 then weights the outputs from each model according the estimated likelihood of being the most correct for that timepoint. If a future value crosses a predetermined threshold, the time difference between a timepoint of that value and the current operation timepoint is provided as the health indicator 170 that is the estimated RUL of the device.

In regards to the Kalman filters of the IMMs, the linear degradation is modeled with a Kalman filter. However, while a linear Kalman filter assumes a linear dynamic system with measurement and process noise, the degradation of electronic devices can be nonlinear, especially towards the end-of-life. Accordingly, the RUL model, through the IMMs, simultaneously considers exponential degradation with an extended Kalman filter, thereby modeling nonlinear degradations. Moreover, as noted previously, additional models may be included within the IMMs to further assist in modeling a character of the degradation at different timepoints. In this way, the correlation system monitors the device and derives the RUL. It should be noted that while determination of the RUL is shown as a discrete element, once the correlation system 100 transitions to determining the RUL at 450, the prediction module 120 may iteratively determine the RUL at subsequent timesteps to adjust the determination according to observations of current values.

At 460, the prediction module 120 provides the RUL. In one approach, the prediction module 120 provides the RUL as a communication to the driver and/or a remote service. For example, the communication to the driver may be an in-vehicle alert that specifies the condition of the device. The alert may be a simple indication of a problem or may provide more detailed information, such as specifying to the driver to adapt use of the vehicle according to the degradation (e.g., limit certain behaviors, such as extended trips, quick acceleration, high speeds, etc.). The alert to the driver may further specify the RUL, thereby indicating how long the device will likely remain functional. The alert may be audio, visual, haptic, etc. Thus, the prediction module 120 may control various systems of the vehicle 200, such as displays, to provide the alert. In an instance, where the prediction module 120 communicates the RUL to a remote service, the communication can be an alert to schedule service and order a replacement for the device. Thus, the communication may be provided to a dealership or other associated repair/service center that then correlates with the driver to service the vehicle. In yet a further embodiment, the prediction module 120 may adapt operation of the vehicle by, for example, limiting functionality (e.g., limiting charging rates, limiting use of ADAS or other automated systems, etc.) of the vehicle. In this way, the correlation system 100 functions to improve determinations about the health of components and facilitate mitigation of failure and servicing of such components.

Figure 5:
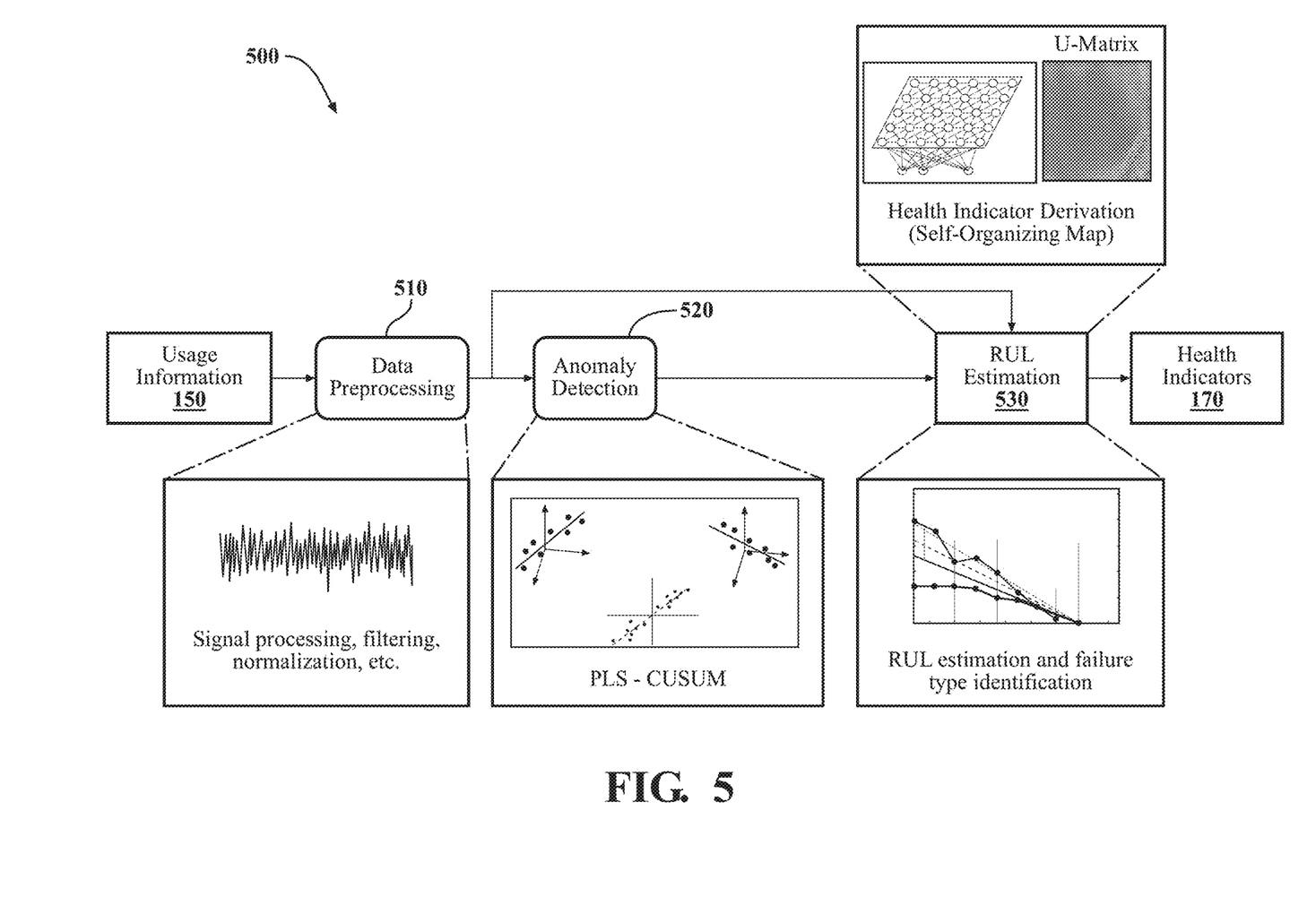
FIG. 5 is a diagram illustrating one example flow between separate components of the disclosed approach.
Figure 6:
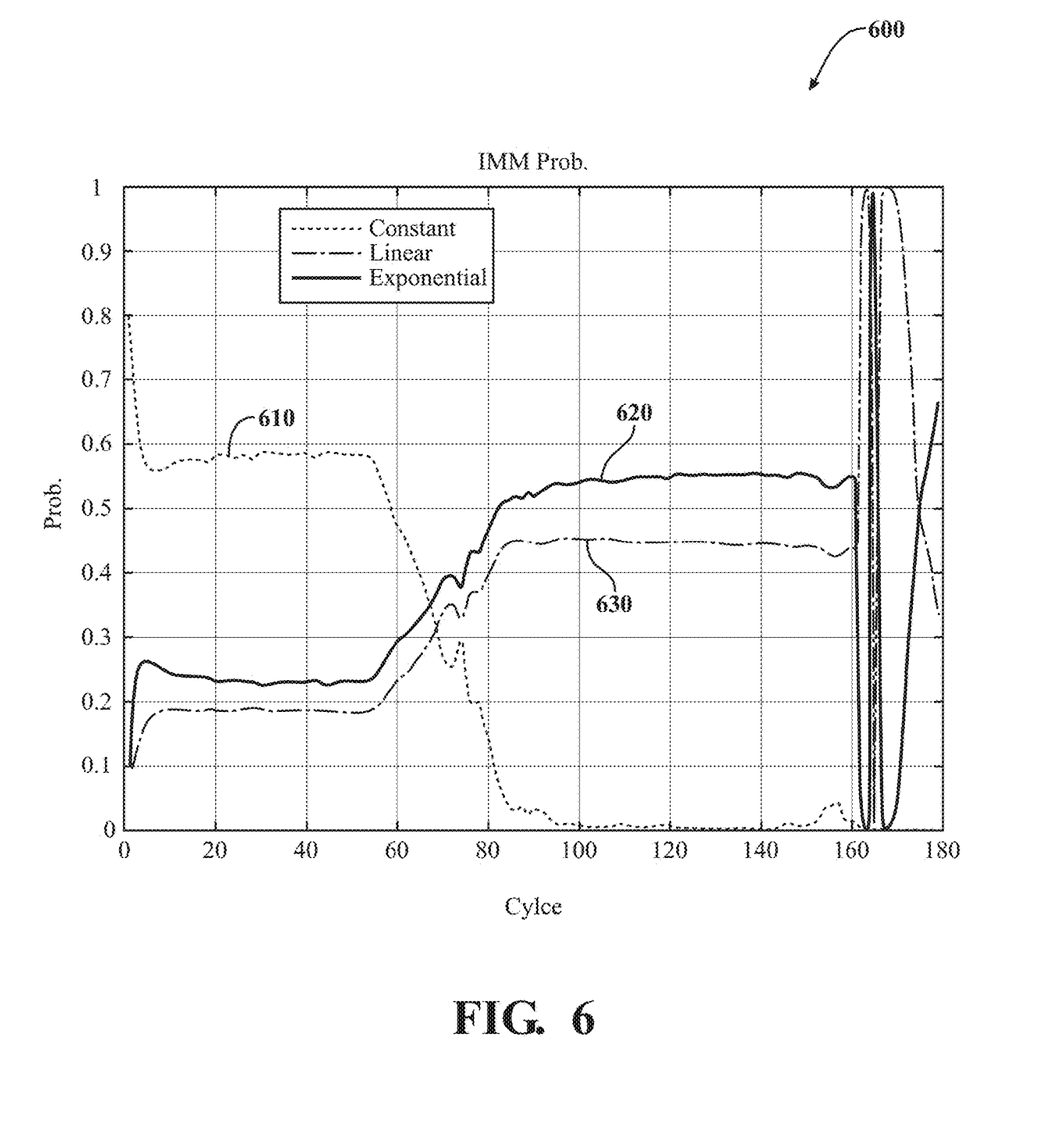
FIG. 6 is a graph illustrating probabilities for separate models.

As a further example of how the correlation system 100 monitors the device, consider FIGS. 5-6. FIG. 5 illustrates an example flow 500 between separate components of the correlation system 100. As illustrated, the flow 500 includes the usage information 150 as the initial input, which is processed by a data pre-processing component 510. The pre-processing component 510 performs the signal processing, filtering, and normalization in order to prepare the included data for processing by subsequent components. The processed data is then provided to both the anomaly detection component 520 and the RUL estimation component 530. Depending on a life stage of the device being analyzed, this information can be used for training and/or analysis to determine the associated outputs.

As previously stated, the anomaly detection involves the determination of the presence of an anomaly, which is generally a generic condition that specifies a variance from healthy operation of the device. In any case, the anomaly detection component 520 iterates over the data as new data is received to monitor the health of the device. Once an anomaly is detected, the flow 500 transitions to the RUL estimation component 530, which implements the SOM and the IMMs to derive the RUL, which is output as the health indicators 170.

The SOM uses the current and prior information about the device to generate SoH values, which are then fed to the IMMs. As further explanation of the IMMs, consider FIG. 6. FIG. 6 illustrates a graph 600 of probability versus cycles/time in the life of the device. In particular, the graph 600 shows differences in accuracies embodied by the probabilities for a constant model 610, a linear model 620, and an exponential model 630. In general, the IMM computes the state estimate by accounting for separate hypothesized degradation. The IMM achieves this by mixing the individual model-conditioned estimates, in one approach. The IMM uses a bank of linear and extended Kalman filters depending on the degradation profiles with at least one for each hypothesized model. The IMM weights the estimates using the posterior probability that the model is correct, given the known data. Alternatively, the correlation system 100 can take the estimate from the most likely model. The graph 600 illustrates how the different models 610-630 have different likelihoods of being correct at different timepoints in the life of the device. Thus, reliance on the different models varies according to the illustrated relationship.

Figure 7:
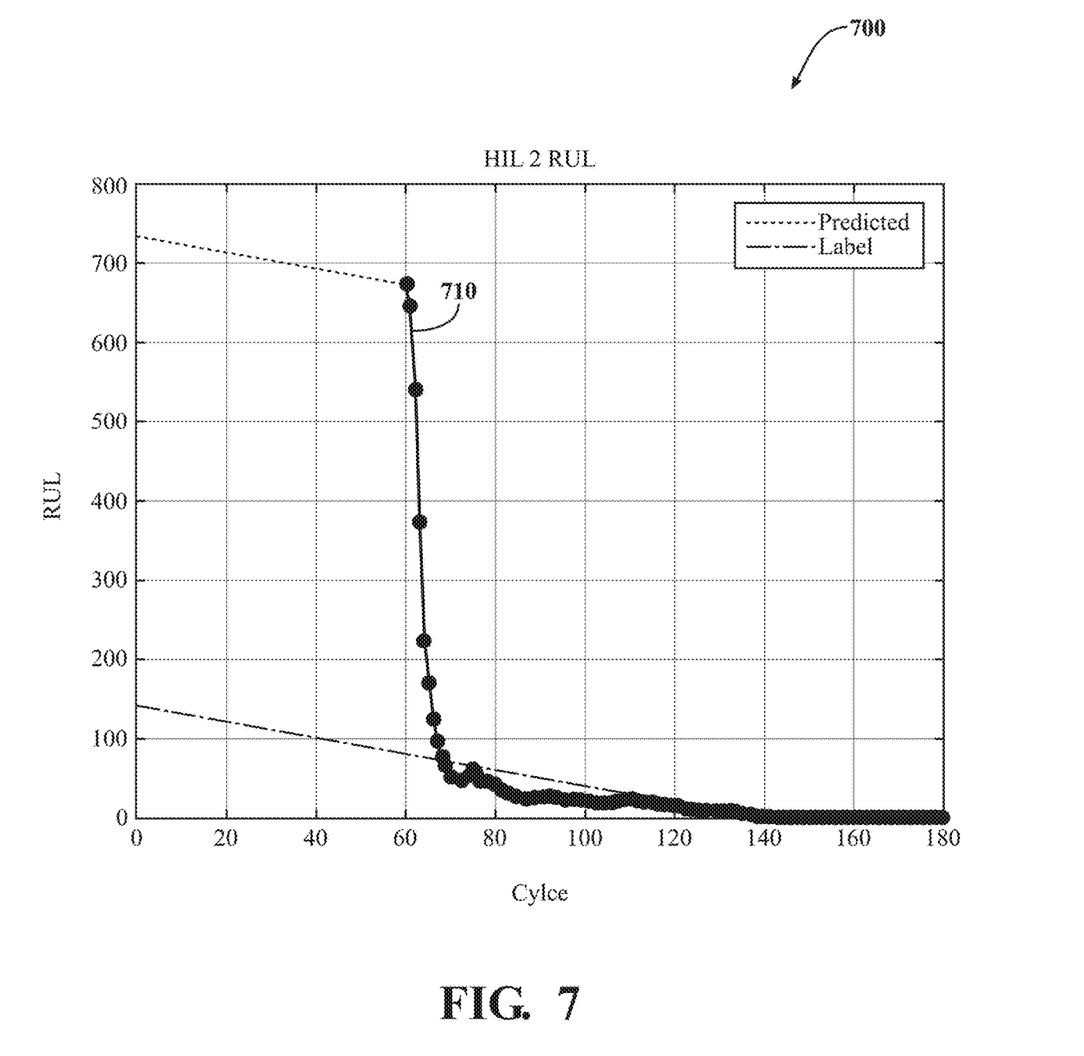
FIG. 7 is a graph illustrating an example prediction of the RUL.

The determination of the RUL from the predicted values is described further in relation to FIG. 7, which illustrates a graph 700 of the estimated RUL over time. As shown in FIG. 7, the predicted RUL 710 begins at a later stage in the life cycle of the device since the RUL is not determined until an anomaly is detected. The line 720 represents a ground-truth value for the RUL, which the calculation quickly approximates. The correlation system 100 generates the RUL according to the determination of when the predicted SoH crosses a threshold for which the timepoint is estimated as the end-of-life, and the remaining useful life is the difference between the EOL and the present.

As an additional aspect of the correlation system 100, training of the models 160 generally occurs simultaneously with the previously noted process and is focused on early life data in order to characterize healthy operation of the device. For example, the correlation system 100 uses early life data of the device for a time when the device is known to be healthy in order to train the anomaly model and the RUL model. In particular, the anomaly model learns a state space defined according to encoded criterion variables. That is, the PLS algorithm encodes the usage information 150 during a healthy early life phase of the device to learn the state space and the transformation of the data.

The RUL model uses the same early life usage information to train the SOM. During training, the correlation system adapts network weights by passing training vectors of the information to the input layer, where the training vectors include information from a single timepoint. The correlation system 100 determines the Euclidean distance from the training vector to each neuron in the map. The closest neuron in the map layer to the input vector is identified as the best-matching unit (BMU). The weight of the BMU and neighboring neurons are adjusted to better match the input vector. This process is repeated for the training data over the early life. In this way, the correlation system 100 ensures that the models 160 are trained to specifically recognize characteristics of the particular device and to provide more nuanced determinations that are specific to the device, thereby improving accuracy.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "operatively connected" and "communicatively coupled," as used throughout this description, can include direct or indirect connections, including connections without direct physical contact.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A correlation system for monitoring health of an electronic device, comprising:
   one or more processors;
   a memory communicably coupled to the one or more processors and storing instructions that, when executed by the one or more processors, cause the one or more processors to:
      acquire usage information about operation of the electronic device;
      determine whether the usage information indicates a presence of an anomaly in the operation of the electronic device according to an anomaly model;
      responsive to detecting the anomaly, determine a remaining useful life (RUL) for the electronic device according to a RUL model that implements a self-organizing map (SOM) and interacting multiple models (IMMs) that are extended Kalman filters, the SOM determines a state of health (SOH) for the usage information and the IMMs predict future values of the SOH at future time points according to the usage information; and
      provide the RUL including mitigating failure of the electronic device according to the RUL by adapting operation of the electronic device that is a vehicle to limit one or more of a charging rate, and an advanced driving assistance system (ADAS), including adjusting operating parameters of the electronic device that restrict behaviors of the vehicle.

2. The correlation system of claim 1, wherein the instructions to determine whether the usage information indicates the presence of the anomaly include instructions to apply the anomaly model that implements partial-least squares regression-cumulative sum (PLS-CUSUM) over the usage information, the anomaly model being trained according to early-life operating characteristics of the electronic device.

3. The correlation system of claim 2, wherein the instructions to apply the anomaly model include instructions to iterative apply the anomaly model over the usage information as the electronic device operates to predict operating values of the electronic device and accumulate a residual according to a covariance between the operating values and observed values, and
   wherein the instructions to determine whether the usage information indicates the presence of the anomaly include instructions to determine when the residual that is accumulated satisfies an anomaly threshold.

4. The correlation system of claim 1, wherein the instructions to provide the RUL include instructions to mitigate the failure of the electronic device by one or more of displaying an alert within the vehicle and adapting operation of the vehicle to limit functionality of at least one system of the vehicle.

5. The correlation system of claim 4, wherein the instructions to apply the RUL model include instructions to select one of the extended Kalman filters for producing the future values of the SOH according to a posterior probability for each of the extended Kalman filters.

6. The correlation system of claim 4, wherein the IMMs separately model degradation of the electronic device according to different ones of the extended Kalman filters.

7. The correlation system of claim 1, wherein the instructions to acquiring the usage information includes collecting signals from one or more sensors associated with the electronic device, the signals being time-series data and indicating one or more of: drain-to-source voltage, drain-to-source resistance, temperature, thermal resistance, and gate-leakage current.

8. The correlation system of claim 1, wherein the electronic device is one of a power control unit (PCU), an electronic control unit (ECU), an insulated-gate bipolar transistor (IGBT), a metal-oxide-semiconductor field-effect transistor (MOSFET), an inverter, and a converter.

9. A non-transitory computer-readable medium for monitoring health of an electronic device and including instructions that, when executed by one or more processors, cause the one or more processors to:
   acquire usage information about operation of the electronic device;
   determine whether the usage information indicates a presence of an anomaly in the operation of the electronic device according to an anomaly model;
   responsive to detecting the anomaly, determine a remaining useful life (RUL) for the electronic device according to a RUL model that implements a self-organizing map (SOM) and interacting multiple models (IMMs) that are extended Kalman filters, the SOM determines a state of health (SOH) for the usage information and the IMMs predict future values of the SOH at future time points according to the usage information; and
   provide the RUL including mitigating failure of the electronic device according to the RUL by adapting operation of the electronic device that is a vehicle to limit one or more of a charging rate, and an advanced driving assistance system (ADAS), including adjusting operating parameters of the electronic device that restrict behaviors of the vehicle.

10. The non-transitory computer-readable medium of claim 9, wherein the instructions to determine whether the usage information indicates the presence of the anomaly include instructions to apply the anomaly model that implements partial-least squares regression-cumulative sum (PLS-CUSUM) over the usage information, the anomaly model being trained according to early-life operating characteristics of the electronic device.

11. The non-transitory computer-readable medium of claim 10, wherein the instructions to apply the anomaly model include instructions to iterative apply the anomaly model over the usage information as the electronic device operates to predict operating values of the electronic device and accumulate a residual according to a covariance between the operating values and observed values, and wherein the instructions to determine whether the usage information indicates the presence of the anomaly include instructions to determine when the residual that is accumulated satisfies an anomaly threshold.

12. The non-transitory computer-readable medium of claim 9, wherein the instructions to provide the RUL include instructions to mitigate the failure of the electronic device by one or more of displaying an alert within the vehicle and adapting operation of the vehicle to limit functionality of at least one system of the vehicle.

13. The non-transitory computer-readable medium of claim 12, wherein the instructions to apply the RUL model include instructions to select one of the extended Kalman filters for producing the future values of the SOH according to a posterior probability for each of the extended Kalman filters.

14. A method, comprising:
acquiring usage information about operation of an electronic device;
determining whether the usage information indicates a presence of an anomaly in the operation of the electronic device according to an anomaly model;
responsive to detecting the anomaly, determining a remaining useful life (RUL) for the electronic device according to a RUL model that implements a self-organizing map (SOM) and interacting multiple models (IMMs) that are extended Kalman filters, the SOM determines a state of health (SOH) for the usage information and the IMMs predict future values of the SOH at future time points according to the usage information; and
providing the RUL including mitigating failure of the electronic device according to the RUL by adapting operation of the electronic device that is a vehicle to limit one or more of a charging rate, and an advanced driving assistance system (ADAS), including adjusting operating parameters of the electronic device that restrict behaviors of the vehicle.

15. The method of claim 14, wherein determining whether the usage information indicates the presence of the anomaly includes applying the anomaly model that implements partial-least squares regression-cumulative sum (PLS-CUSUM) over the usage information, the anomaly model being trained according to early-life operating characteristics of the electronic device.

16. The method of claim 15, wherein applying the anomaly model is iterative over the usage information as the electronic device operates to predict operating values of the electronic device and accumulate a residual according to a covariance between the operating values and observed values, and wherein determining whether the usage information indicates the presence of the anomaly includes determining when the residual that is accumulated satisfies an anomaly threshold.

17. The method of claim 14, wherein mitigating the failure of the electronic device includes one or more of displaying an alert within the vehicle and adapting operation of the vehicle to limit functionality of at least one system of the vehicle.

18. The method of claim 17, wherein applying the RUL model includes selecting one of the extended Kalman filters for producing the future values of the SOH according to a posterior probability for each of the extended Kalman filters.

19. The method of claim 17, wherein the IMMs separately model degradation of the electronic device according to different ones of the extended Kalman filters.

20. The method of claim 14, wherein acquiring the usage information includes collecting signals from one or more sensors associated with the electronic device, the signals being time-series data and indicating one or more of: drain-to-source voltage, drain-to-source resistance, temperature, thermal resistance, and gate-leakage current, and wherein the electronic device is one of a power control unit (PCU), an electronic control unit (ECU), an insulated-gate bipolar transistor (IGBT), a metal-oxide-semiconductor field-effect transistor (MOSFET), an inverter, and a converter.

\* \* \* \* \*